Figure 1:
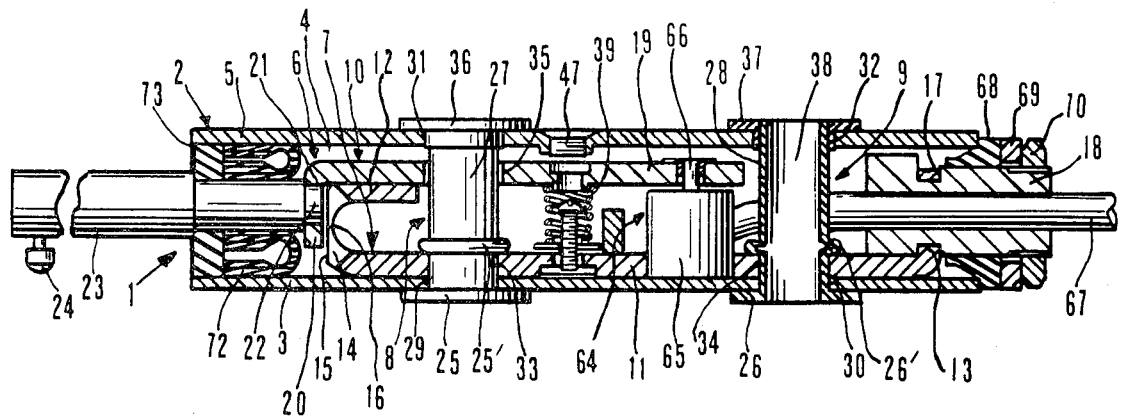

United States Patent [19]

Dall'Aglio

[11] 4,393,592
[45] Jul. 19, 1983

[54] GAUGE FOR CHECKING LINEAR DIMENSIONS OF MECHANICAL PIECES

[75] Inventor: Carlo Dall'Aglio, Volta Reno di Argelato, Italy

[73] Assignee: Finike Italiana Marposs, S.p.A., S. Marino di Bentivoglio, Italy

[21] Appl. No.: 283,875

[22] Filed: Jul. 16, 1981

[30] Foreign Application Priority Data

Jul. 22, 1980 [IT] Italy .................................. 2477 A/80

[51] Int. Cl.$^3$ ........................... G01B 5/02; G01B 7/02
[52] U.S. Cl. ................................. 33/172 B; 33/172 E
[58] Field of Search ............... 33/148 H, 149 J, 169 R, 33/171, 172 B, 172 E

[56] References Cited

U.S. PATENT DOCUMENTS

| | | | |
|---|---|---|---|
| 2,229,748 | 1/1941 | Lawrence | 33/178 R |
| 2,509,986 | 5/1950 | Neff | 33/172 E |
| 2,787,836 | 4/1957 | White | 33/172 B |
| 3,214,839 | 11/1965 | Cunningham | 33/172 B |
| 3,420,222 | 1/1969 | Noe et al. | 33/148 H |
| 3,812,590 | 5/1974 | Nigg et al. | 33/172 E |
| 4,329,782 | 5/1982 | Possati et al. | 33/172 E |
| 4,341,019 | 7/1982 | Possati | 33/172 E |

FOREIGN PATENT DOCUMENTS 963848  5/1957  Fed. Rep. of Germany.

OTHER PUBLICATIONS

Tesa-"Douotast" available at the 3.European Machine Tool Exhibition held in Milan from 10 to 18 Oct. 1979.

Primary Examiner—Richard R. Stearns
Attorney, Agent, or Firm—Stevens, Davis, Miller & Mosher

[57] ABSTRACT

A gauge for checking linear dimensions of mechanical parts comprises a support, a movable gauging arm, a transducer coupled to the movable arm and the support, and a helical spring defining a longitudinal geometrical axis and having a first end in abutment with the movable arm and the second end in aubtment with a movable element of an adjustment device for adjusting the force applied by the spring to the gauging arm, the device comprising a screw coaxial to the spring and arranged within the spring coils, and a stanchion which controls a translation movement of the movable element along an axis substantially coinciding with the spring axis, translation movement of the movable element changing the axial length of the spring and, consequently, the force it applies to the gauging arm.

9 Claims, 2 Drawing Figures

GAUGE FOR CHECKING LINEAR DIMENSIONS OF MECHANICAL PIECES

The present invention relates to a gauge for the dimensional checking of mechanical pieces, including support means; a gauging arm; means for connecting the arm to the support means adapted to enable movements of the arm; a feeler, fixed to the movable arm to contact the surface of the piece to be checked; a spring including coils defining a geometrical axis, the spring having a first end cooperating with the gauging arm; and adjustment means with a movable element cooperating with a second end of the spring, for adjusting the force applied by the spring to the gauging arm.

In a known gauge there is a helical spring defining a longitudinal geometrical axis that has a first end contacting a movable gauging arm and the other end resting on the head of a screw screwed in a threaded hole of a support located inside the gauge. By screwing or unscrewing the screw it is possible to alter the distance between the head of the screw and the portion of the arm that contacts the spring, consequently it is possible to adjust the force applied by the spring to the arm.

Owing to the frictions that exist between the ends of the spring, and, respectively, the screw head and the gauging arm, the actuation of the screw causes a spring torsion that can affect the gauge measurement accuracy in the event that this torsion changes during the use of the gauge. Furthermore in this known gauge the dimensions of the axial spring and of the screw are excessive.

It is an object of the present invention to provide a gauge having adjustment means adapted to adjust the force applied by return or compression springs to transmit to the spring substantially axial adjustment action, and which are of small dimensions and inexpensive.

This object is achieved by a gauge wherein the adjustment means include a control device, coupling means to couple the control device to the support means while allowing the rotation of the control device about the axis, the control device being coaxial with the spring and arranged substantially inside the coils of the spring. The adjustment means further include a member fixed to the support means that cooperates with the movable element in order to prevent it from rotating, the control device cooperating with the movable element in order to control its axial translation.

Figure 2:
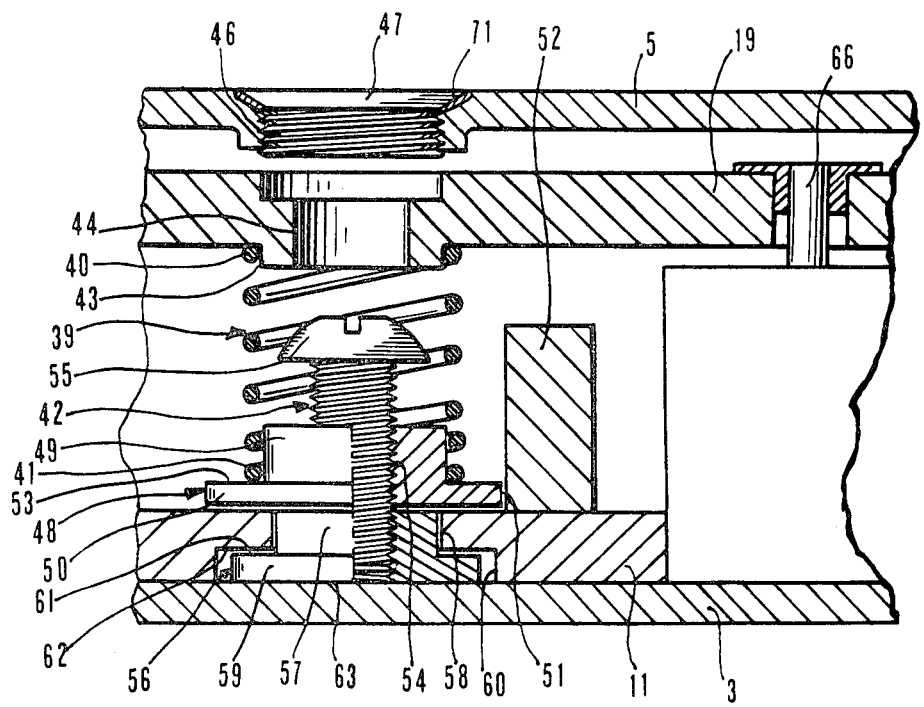

In order that the invention may be clearly understood and readily carried into effect, the same is now described with reference to the accompanying drawings, given by way of non-limiting example, in which:

FIG. 1 is a vertical sectional view of a gauge according to a preferred embodiment of the invention; and FIG. 2 is an enlarged scale partly cut-away detail of the gauge shown in FIG. 1.

With reference to FIGS. 1 and 2, the gauge 1 includes a support means comprising an outer casing 2, consisting of a stainless steel tubular section commercially available on the market. The tubular section has a cross-section with a substantially square perimeter.

The outer casing 2 has walls, three of which, 3, 4 and 5, are shown in the drawings, with internal faces broached in such a way as to be perfectly plane and parallel two by two.

Inside casing 2 there is arranged an armset 6. Armset 6 includes a base element 7, fixed to wall 3 by means of two tubular rivets 8 and 9, as well as an element 10 connected to element 7.

The base element 7 is made of bent sheet steel for springs and includes an intermediate section 11, that is parallel to the internal face of wall 3, an end portion 12 bent in a direction parallel to the intermediate portion 11 and an end wing 13.

The end portion 12 is joined to intermediate portion 11 by means of a portion 14 lightened by means of a plane chamfer 15 in order to define a fulcrum 16 with an axis of rotation substantially perpendicular to the plane of FIG. 1. The end portion 12 can perform limited rotational movements about fulcrum 16, with respect to the intermediate portion 11.

The end wing 13 extends in a direction substantially perpendicular with respect to the direction of the intermediate portion 11 and defines a lateral opening 17 which houses a section of cableclamp 18.

Element 10 is made of bent sheet steel for springs and includes a portion 19 that is parallel to portion 12 and is welded to portion 12 and a wing 20. Wing 20 is perpendicular to portion 19, and defines a hole 21 wherein there is inserted an end 22 of a movable gauging arm 23 that carries, at its other end, a feeler 24 adapted to touch mechanical parts to be checked. Element 10 defines means for connecting the gauging arm 23 to the support means.

Rivets 8 and 9 have annular heads 25 and 26 in abutment with the external face of wall 3 and tubular stems 27 and 28 inserted in holes 29, 30, 31 and 32 of casing 2 and in holes 33, 34 and 35 of armset 6. After riveting, rivets 8 and 9 have second annular heads 25' and 26' that, together with heads 25 and 26 and the portions of stems 27 and 28 connecting heads 25, 25' and 26, 26', respectively, clamp armset 6 to wall 3. Hole 35 matches with tubular stem 27 with some radial play adapted to allow portion 19 to rotate about fulcrum 16 during the measurement displacements of feeler 24. Substantially, owing to the fact that portion 19 is fixed to gauging arm 23, it can be considered as part of the gauging arm.

In the portions of the tubular stems 27 and 28 that protrude from wall 5 there are inserted tubular caps 36 and 37 that pass through holes 31 and 32 and are in abutment with the outer face of wall 5.

Between annular heads 25, 26 and the external face of wall 3, between tubular caps 36, 37 and the external face of wall 5 and between caps 36, 37 and tubular stems 27, 28 there is spread an epoxy resin adhesive that has the purpose of ensuring an efficient connection of the matched parts and also preventing humidity from entering inside casing 2 through holes 29, 30, 31 and 32.

When the assembling has been accomplished, the outside faces of annular heads 25 and 26 of tubular caps 36 and 37 and the ends of stems 27 and 28 are ground so that they lie in two plane and parallel surfaces.

Rivets 8 and 9 and caps 36 and 37 define two holes transversally passing through casing 2, only one of which, 38, is shown in FIG. 1, that enable clamping the gauge to an external support, not shown in the drawings, by means of a clamping device, also not shown.

A helical spring 39 defining a geometrical axis substantially perpendicular to portions 11 and 19 has a first end 40 in abutment with portion 19 and a second end 41 cooperating with an adjustment device 42 that serves to adjust the contact force applied by spring 39 to element 10 and consequently to gauging arm 23 connected to element 10. Portion 19 has a cylindrical projecting part 43, with generating lines parallel to the axis of spring 39 that transversally positions spring end 40 and a hole 44, that is substantially coaxial to spring 39. The cylindrical projecting part 43 forms a single piece together with element 10, because it is obtained by a semi-cutting operation.

The external wall 5 has a hole 46, tapped by a screw 47, in correspondence to hole 44.

The adjustment device 42 includes a movable element consisting of a cap 48 with a cylindrical portion 49 that has generating lines that are parallel to the axis of spring 39, and a flange 50. Flange 50 has a lateral plane surface 51 in abutment with a lateral face of a member, i.e. a stanchion 52, having the shape of a parallelepipedon. Stanchion 52 is fixed to the intermediate portion 11 in a way that has not been shown.

End 41 of spring 39 abuts against a plane surface 53 of flange 50, perpendicular to the generating lines of the cylindrical portion 49 and is positioned transversally by the outer surface of the cylindrical portion 49.

Cap 48 has a threaded hole 54, coaxial to spring 39, that matches with a control device consisting of a screw 55 substantially located inside the coils of spring 39. Screw 55 has an end portion which is screwed to a coupling means, i.e. a support and reference device, cap 56, and is welded to the reference cap or locked thereto by means of an epoxy resin adhesive.

Cap 56 has a support cylindrical portion 57, with generating lines that are substantially parallel to the axis of spring 39. Portion 57 is arranged, with a small radial play, into a cylindrical hole 58 in the intermediate portion 11. Cap 56 also includes a reference portion consisting of a cylindrical flange 59 inserted in a hole 60, of the intermediate portion 11, that is coaxial to hole 58. Holes 58 and 60 are substantially coaxial to spring 39.

A plane base 61 of flange 59 can abut against a surface 62 that joins the surfaces of holes 58 and 60, while the other base 63 can abut against the internal face of wall 3.

Screw 55 can turn about its longitudinal axis but, owing to cap 56, it cannot move in a direction parallel to its longitudinal axis, with respect to armset 6.

Gauge 1 also includes a position transducer 64 of the differential transformer type that has a fixed part 65 connected to the base element 7 of armset 6 and a movable part 66 connected to portion 19 of the armset. The fixed part 65 has a primary and two secondary windings of the differential transformer, while the movable part 66 has a magnetic core that is movable with respect to the windings.

A cable 67 connects the windings of transducer 64 to a power supply, processing and display unit, not shown in the drawings. Cable 67 passes through cableclamp 18 that clamps it with respect to armset 6 so preventing any electric wire connections between the power supply, processing and display unit and the windings of the differential transformer from being torn.

Cable-clamp 18, a sealing gasket 68, a washer 69 and a nut 70, that matches with cable-clamp 18, seal the opening of casing 2 adjacent to wing 13. A rubber gasket 71, or a gasket made of a soft metal, for example aluminium or copper, is placed between screw 47 and wall 5 in order to seal hole 46.

A gasket 72 and a resilient membrane 73 are placed between the gauging arm 23 and the internal faces of casing 2, in order to make the gauge sealtight.

Gauge 1 operates in the following way.

The compression spring 39 urges portion 19 against a stop, not shown, that limits the rotation of portion 19 in a counterclockwise direction. When the part or piece to be checked is placed in the measuring position, so touching feeler 24, it gives rise to a clockwise rotation of arm 23 and portion 19 connected to it about fulcrum 16. Spring 39 opposes the rotation of portion 19 by applying to it a force that keeps feeler 24 pressed against the piece to be checked. The rotation of portion 19 causes a variation in the mutual position of the fixed part 65 with respect to the movable part 66 of transducer 64. This variation is transformed into an electrical signal responsive to the deviation of the dimension of the piece checked from a nominal known value.

The force applied by spring 39 to portion 19, and consequently that which the feeler 24 applies to the piece to be checked, can be adjusted by the adjustment device 42 in the following way.

By unscrewing screw 47, and by using a screwdriver, it is possible to reach screw 55 of the adjustment device 42, by passing through holes 44 and 46. By turning screw 55, cap 48, that cannot turn because the lateral plane surface 51 abuts against a lateral face of stanchion 52, is forced to screw onto screw 55 translating in a direction parallel to the axis of spring 39. The translation of cap 48 causes a variation in the axial distance between end 41, that contacts base 53 of flange 51, and end 40 that cannot move because in contact with portion 19, that is in turn urged by spring 39 against the previously mentioned stop. The adjustment of the distance of ends 40 and 41 enables adjusting the force applied by spring 39 to portion 19 and consequently the force applied by feeler 24 to the pieces to be checked. As is known, the variation in the axial length of a helical spring causes a variation in the resilient force applied by the spring that is proportional to the actual variation in length.

The limits in the adjustment range of device 42 are determined by the contact of flange 50 with portion 11 and of the cylindrical portion 49 with the head of screw 55.

Device 42 enables the adjustment of spring 39 without causing its torsion.

It is evident from the previous description and drawings that adjustment device 42 and spring 39 occupy little axial space, thanks to the arrangement of screw 55 inside the spring coils.

The connection of the adjustment device 42 of spring 39 to the bent sheet steel armset 6 can be achieved by a simple and inexpensive machining of armset 6 such as, for example, piercing.

Adjustment device 42 can also be used to adjust the tension of springs that work in traction. To this purpose it is sufficient to suitably fix the ends of the spring to portion 19 and to flange 50 respectively.

An advantage of the gauge consists in the possibility of inserting inside tubular casing 2 armset 6, when already equipped with its adjustment device 42, stanchion 52 and position transducer 64, simply by entering it from one end of casing 2.

A further advantage consists in the possibility of reaching the adjustment device 42 directly from the outside of the gauge without having to slide out armset 6 from the tubular casing 2.

It will be obvious to those skilled in the art that changes and modifications may be made without departing from the scope of this invention in its broader aspects.

What is claimed is:

1. A gauge for the dimensional checking of mechanical pieces, including supporting means; a gauging arm; means for connecting the arm to the support means adapted to enable movement of the arm; a feeler, fixed to the movable arm to contact the surface of the piece to be checked; a spring including coils defining a geometrical axis, the spring having a first end cooperating with the gauging arm; and an adjustment device with a movable element cooperating with a second end of the spring, for adjusting the force applied by the spring to the gauging arm, wherein said adjustment device includes a control device, coupling means to couple the control device to the support means while allowing the rotation of the control device about said axis, the control device being coaxial with the spring and arranged substantially inside the coils of the spring, the adjustment device further including a member fixed to the support means and that cooperates with the movable element in order to prevent it from rotating while permitting its axial translation along said axis, the control device being coupled to the movable element to control said axial translation.

2. The gauge according to claim 1, wherein the control device includes a screw and the coupling means include a support and reference device fixed to the screw and having a substantially cylindrical portion housed in a hole defined by the support means to enable the rotation of the screw about said axis and an axial reference portion adapted to cooperate with the support means for preventing axial displacements of the screw.

3. The gauge according to claim 2, wherein the movable element includes a cap with a threaded hole threadedly coupled to the screw, an axial resting surface for said second end of the spring and a transversal reference surface adapted to cooperate with the spring in order to prevent displacements of said second end in a direction perpendicular to said axis.

4. The gauge according to claim 3, wherein the movable element and the member include facing surfaces that are plane and parallel to said axis, these surfaces being adapted to cooperate with each other in order to prevent the rotation of the movable element.

5. The gauge according to one of claims 2 to 4, wherein said gauging arm defines a hole coaxial to said axis for allowing access to the screw.

6. The gauge according to claim 5, wherein said support means include an outer casing, said casing defining a hole coaxial to said axis for allowing access to the screw from the outside.

7. The gauge according to one of claims 1 to 4, wherein the gauging arm includes a flat sheet steel element, substantially perpendicular to said axis, a portion adapted to define an axial abutment surface for the spring and a projecting part with a transversal reference surface adapted to cooperate with the spring in order to prevent displacements of the first end of the spring in a direction perpendicular to said axis.

8. The gauge according to claim 7, wherein said arm portion and said projecting part form a single piece together with the sheet steel element, the projecting part being obtained through a semi-cutting operation of the sheet steel.

9. The gauge according to claim 1, wherein said support means include an outer casing basically consisting of a tubular section and a first flat sheet steel element fixed to an internal face of the casing, the gauging arm including a portion external to the casing and a portion inside the casing, the internal portion including a second flat sheet steel element connected to the first flat sheet steel element and substantially arranged in a longitudinal direction with respect to the casing, the second element having abutment surfaces adapted to cooperate with the first end of the spring in order to provide to it an axial and transversal reference with respect to said geometrical axis, the geometrical axis being substantially perpendicular to said longitudinal direction, and in which the casing and the second flat sheet steel element define two aligned holes for allowing access to said control element from the outside of the casing, the control element consisting of a screw.

* * * * *

UNITED STATES PATENT AND TRADEMARK OFFICE
CERTIFICATE OF CORRECTION

PATENT NO. : 4,393,592
DATED : July 19, 1983
INVENTOR(S) : Carlo DALL'AGLIO

It is certified that error appears in the above—identified patent and that said Letters Patent is hereby corrected as shown below:

On the title page:

Under the Foreign Application Priority Data [30] change "2477" to --3477--.

In the Abstract, line 6, correct the spelling of --abutment--.

Signed and Sealed this

First Day of November 1983

[SEAL]

Attest:

GERALD J. MOSSINGHOFF

Attesting Officer

Commissioner of Patents and Trademarks